April 22, 1952     E. E. CANNON     2,593,843
CRATE DISASSEMBLING AND SALVAGING MACHINE
Filed Dec. 5, 1949     2 SHEETS—SHEET 1
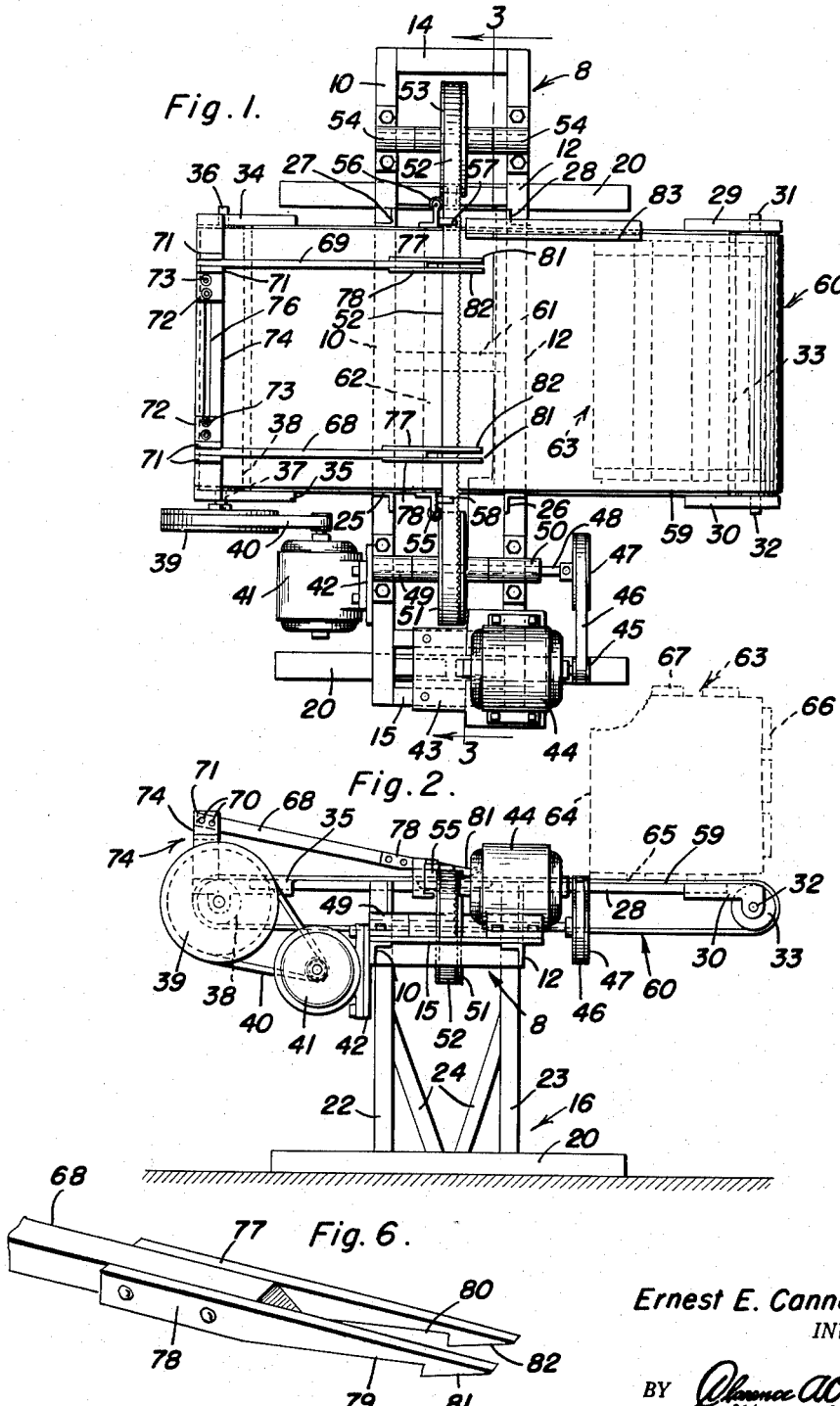
Ernest E. Cannon
INVENTOR.

April 22, 1952 E. E. CANNON 2,593,843
CRATE DISASSEMBLING AND SALVAGING MACHINE
Filed Dec. 5, 1949 2 SHEETS—SHEET 2

Ernest E. Cannon
INVENTOR.

Patented Apr. 22, 1952

2,593,843

UNITED STATES PATENT OFFICE 2,593,843

CRATE DISASSEMBLING AND SALVAGING MACHINE

Ernest E. Cannon, Lyford, Tex., assignor to Valley Products Corporation, Lyford, Tex., a corporation of Texas Application December 5, 1949, Serial No. 131,148

7 Claims. (Cl. 29—68)

The present invention relates to special machines and apparatus and has more particular reference to an ingenious machine which makes it possible to readily strip all of the slats from a comparatively heavy vegetable crate without damaging either the slats or heads, whereby the latter may be shipped back to the produce company to be again assembled, re-nailed and transformed into crates to be used again.

It is felt that it would be neither feasible nor profitable to attempt to hammer, pry or otherwise remove the slats off of the crate ends or heads with hand tools, and to in that manner disassemble the parts for further use. However, to be able to accomplish such a result speedily and by way of a practical and highly assistive machine seems to be an acceptable solution to the salvaging and re-using problem. In carrying out the principles of the instant invention, a simple and practical machine has been evolved and produced wherein the slats may be pried loose, one at a time, to expose the nails, and the nails sawn through, whereby to free the slats in proper succession and to be able to salvage all of the slats and heads intact, of course, to be shipped back to an interested produce company for ready re-assembling and continued use.

While it may be practical to utilize saw means in the form of a reciprocatory saw or perhaps a rotary saw, it is an object of the present invention to provide a reliable motor-driven band saw and to position the nail sawing run of the saw in a plane slightly above the crate conveying means to properly line up with the exposed nails, once the slats have been mechanically pried open and thus loosened.

A further object of the invention has to do with a supporting structure which is characterized by a table having a transverse deflected slat clearance groove over which the flexible endless conveyor belt runs and situated directly beneath the cutting run of the band saw, whereby to provide the necessary tilting clearance for each tilted or deflected slat as it is pried loose and opened up to expose the nails for severance by the band saw.

Another object of the invention has to do with suitable abutment or guide means along one marginal edge of the endless conveyor belt against which the standing attendant may press one end of the crate to keep it properly lined up with the conveyor belt, the band saw, and also the novel slat prying and deflecting means which latter is an essential part of the over-all apparatus or machine.

An equally important aspect of the invention has to do with a table with a belt deviation clearance groove or pocket, a properly guided and spaced band saw operating directly above the groove with the flexible conveyor belt travelling between the table, saw, and coacting with the groove, and a pair of reach arms above the belt which are inclined and rigidly mounted at one end of the table and which are provided with slot holddown prying and deflecting fingers adapted to ride against the inner surfaces of the ends or heads of the crate, in a manner to forcibly pry the slats loose, to expose the nails, and to thus pave the way for the saw to enter between the slats and marginal edges of the heads for severance of the nails.

An over-all objective is to provide a machine of the type herein under consideration which is comparatively simple, reliable, economical, and in which manufacturers, retailers and users will find their anticipated requirements and needs fully met, contained and conveniently available.

Other objects and advantages will become more readily apparent from the following description and the accompanying illustrative drawings.

In the accompanying sheets of drawings, wherein like numerals are employed to designate like parts throughout the views:

Figure 1 is a top plan view of a crate disassembling and parts salvaging machine constructed in accordance with the principles of the present invention.

Figure 2 is a side elevation of the same.

Figure 6 is a perspective view showing the camlike wedges on the free end portions of the slat hold-down and prying fingers.

Figure 3:
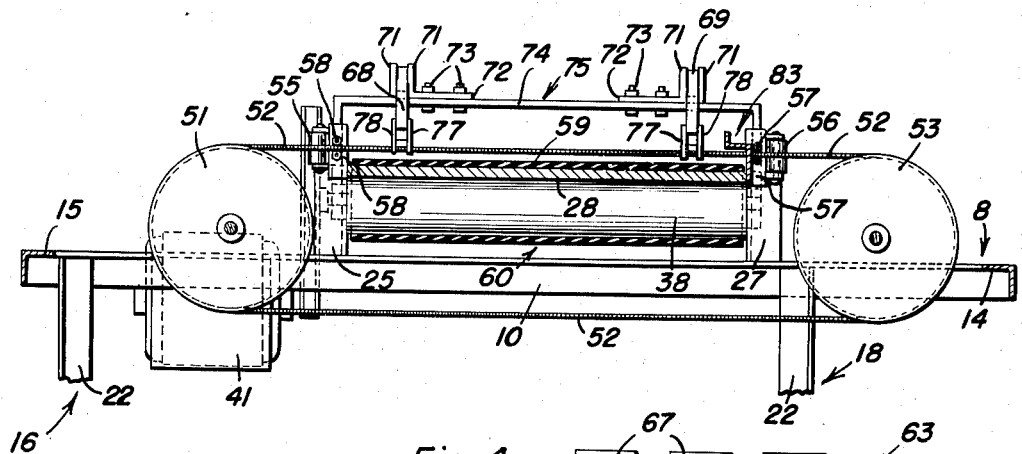
Figure 3 is a transverse or horizontal sectional view taken on the irregular line 3—3 of Figure 1, looking in the direction of the arrows, said view being enlarged and fragmentarily drawn.

Referring now to the drawings by reference numerals and lead lines, the numeral 8 designates a substantially rectangular frame embodying, as shown in Fig. 1, a pair of longitudinal angle irons 10 and 12, respectively connected together at opposite ends by transverse angle irons 14 and 15. This frame 8 is elevated to assume the desired plane by a pair of leg frames 16 and 18. As shown in Figure 3, the leg frame 16 is close to the left-hand end of the frame 8 while the leg frame 18 at the opposite end is spaced inwardly from the right-hand end of the frame 8. In either event, each leg frame comprises a suitable base member 20 (see Figs. 1 and 2), a pair of vertical legs 22 and 23, and suitable diagonal braces 24.

Attached to and rising from intermediate portions of the angle irons 10 and 12 are relatively short vertical uprights 25 and 26 on one side in Figure 1 and 27 and 28 on the other side in the same figure. These serve to support a horizontal table 28 as shown in Figure 3. The table is at right angles to the intermediate portion of the frame 8. Said table is provided at the right-hand end in Figure 1 with suitable brackets or fixtures 29 and 30, and these are provided with bearings for journals 31 and 32 on the ends of an idling drum or roller 33. Also, as shown in Figure 1, similar bearing brackets 34 and 35 are mounted on the left-hand corner portions of the table and these have bearings to accommodate journals 36 and 37 carrying the remaining drum 38. The journal 37 is also provided with a pulley 39 to accommodate a belt 40 driven from a pulley on an electric motor 41. The motor 41 is supported on a vertical hanger plate 42 which is, in turn, supported on angle iron 10 of the framework 8. The framework 8 also serves to accommodate a base plate 43 for a second electric motor 44 whose pulley 45 drives an endless belt 46 which drives a pulley 47 carried by a shaft 48 mounted in bearings 49 and 50 on the angle irons 10 and 12, respectively. The shaft 48 carries a pulley 51 which supports and drives the endless band saw 52. The band saw is trained over a second companion pulley 53 having journal means rotatable in bearings 54—54 (see Figure 1). The numeral 55 designates a vertical idling and guide roller on one edge of the table and 56 another similar guide roller on the other edge of the table. These guide rollers cooperate with horizontal guide rollers 57—57 and 58—58 (see Fig. 3) and these two sets of three rollers each serve to guide and stabilize the operation of the upper run of the band saw. The band saw extends transversely across the underlying upper run 59 of a flexible endless crate conveyor belt 60, the latter trained over the aforementioned friction and driving drums 33 and 38, respectively. Incidentally, the numeral 61 (dotted lines) in Figure 1 denotes a cross brace in the aforementioned framework 8.

Figure 4:
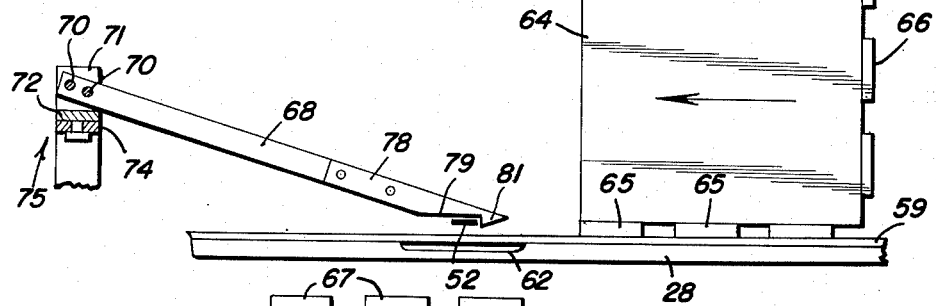
Figure 4 is an enlarged view, somewhat diagrammatic in nature, showing the grooved platform or table, crate, portion of the belt, the saw and one of the bars with slat holddown, deflecting and prying fingers.
Figure 5:
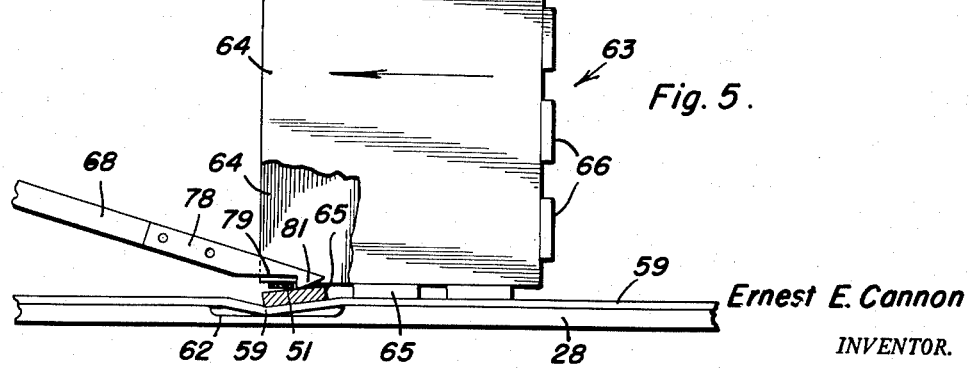
Figure 5 is a view based on Figure 4 and showing the next step, the step wherein the first or initial slat has been pried loose and opened up sufficiently to expose the nails to the band saw.

Attention is now directed to Figures 4 and 5, wherein it will be observed that the intermediate top surface of the table is provided with a shallow transverse groove or channel 62 which is a clearance pocket. The nail cutting run of the band saw rides in spaced parallelism above said pocket. Also, the upper run 59 of the conveyor belt runs across the groove 62 and is adapted to be bent and depressed so that it will flex and recede into the groove, as shown in Figure 5. Before further discussing this phase of construction and operation, attention is directed to the pry bar means for depressing, forcing, and gradually prying the slats loose from the crate ends or heads. The crate is denoted by the numeral 63 and includes customary end heads 64 and a series of slats 65, 66, and 67, respectively. There are three such slats on each side of the crate, as is customary. The slats are fastened to the marginal edges of the end heads by severable nails. Of course, the nail severing step is done by the powered band saw. To make this possible, it has been deemed necessary to loosen and open up each slat before admitting the band saw to the space between the slat and crate head for cutting through the nails as they are progressively met. I provide a pair of complemental forwardly and downwardly inclined reach arms or bars 68 and 69, respectively. The left-hand ends of the respective arms are elevated and rigidly secured by rivets or other fastenings 70 between pairs of upstanding ears 71 on brackets 72 which are bolted and slidably mounted at 73 on the bight portion 74 of an inverted U-shaped adapter frame 75. This bight portion has an elongated slot 76 which makes it possible to shift the respective brackets toward and from each other for adjusting the distance between the arms 68 and 69. The lower inclining ends of the arms are provided with pairs of parallel, rigidly mounted work holddown fingers 77 and 78, as shown in Fig. 6. That is to say, each arm has a pair of fingers, and these fingers have their spaced end portions projecting beyond the arms and notched out, as at 79 and 80, and terminating in cam-like wedges or pry-heads 81 and 82. The notched portions of the said heads serve to accommodate the moving or cutting run of the band saw, as shown best in Figures 4 and 5. The wedge-shaped heads projecting at right angles beyond the leading or toothed edge of the saw function as slat deflecting cams. The arms and fingers are comparatively heavy and are fixed in a manner to engage each slat, one by one, and to pry it loose in an obvious manner. Of course, in a machine like this, the crate is held and properly maneuvered and manipulated by the hands of the attendant and, in so doing, he presses one end or head against the fixed guide rail 83 on the far side in Figure 1. This guides one end of the crate and the crate is then held down firmly on the endless flexible belt, that is, the upper run 59 of the belt. The crate is positioned in such a way that the open side approaches the cutting teeth on the band saw. As the crate is conveyed from right to left, it moves from the position shown in Figure 4 to the position shown in Figure 5, and, while being properly manipulated and held in the attendant's hands, the pry-heads on the fingers 77 and 78 enter into the open side of the crate and ride in contact with the inner surfaces of the heads of the crate. The initial slat is therefore "cammed" loose and the dip down clearance for this step is permitted by the slat angling and depressing itself and bending the conveyor belt into the clearance recess 62. As the slat rides down the cam surfaces of the heads 81 and exposes the nails, the next step causes the band saw to enter between the marginal edge of the end heads of the crate in a manner to sever the nails. Each slat is thus removed and after the slats on one side are disassembled, those on the next side are stripped off and so on until all of the slats are freed and ready for shipment and re-use. It will be obvious that although the crate is conveyed by the belt the attendant has to guide the crate along the guide rail 83 and has to pilot the crate against the camming heads 81 and 82. Also, he has to handle the crate according to training and skill. Thus, good results are traceable as much to the "manual" as well as to the "mechanical" stages of the over-all method of operation.

By having the arms 68 shiftable on the adapter arch, it is possible to adjust said arms toward and from each other to handle both large and small crates.

It is highly important that the table, whether it be a flat board or other equivalent frame structure, have clearance pockets or equivalent means 62 to allow the slats, which are moved along in a horizontal plane even with the table, to dip down and to be sufficiently loosened to expose the nails for clearcut severance of the nails. By properly locating the plane of the band saw, it accomplishes the nail-severing requirements without damage to the wood of either the slats or end heads of the crate.

Accurate choice and coordination in assembling of all parts is essential in order that the parts will function in timed relationship and progression to insure loosening and partial dislodgment of the slats in order to expose the nails and to make it possible for the saw to enter the space between the slots and edges of the crate heads to cleanly sever the nails without damaging the saw, the slats and heads, or subjecting the attendant to undue and laborious strain and effort.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A crate disassembling and parts salvaging machine of the class shown and described comprising a fixed support, an endless crate conveyor belt mounted for operation on said support, said support including a table, said table having a transverse clearance groove, the upper run of said belt spanning said groove, means fixed on said support for forcibly deflecting slats, partly withdrawing the nails and loosening and opening up the slats one by one from the usual crate heads, for directing the loosened slats against the belt and causing the belt to bend, recede into said groove, and powered saw means for sawing through the nails and completely detaching the slats from said heads, said saw means being coordinated with the first means for simultaneous coaction with the latter.

2. A crate disassembling and parts salvaging apparatus of the class shown and described comprising a relatively stationary table provided with a transverse clearance groove, a powered endless crate moving belt having one run operable across said table and also operable across said groove, an endless band saw mounted transversely across the table and having its effective nail cutting run in spaced relation above the table and belt and in alignment with said groove, and arm means rigidly mounted on said table and having cam heads over said belt and in advance of the leading edge of said band saw.

3. A crate disassembling and parts salvaging machine of the class shown and described comprising a horizontal fixed table having a transverse groove in its top, a powered endless flexible crate moving belt having its effective run movable across the top of said table and spanning said groove, a pair of spaced parallel downwardly inclined reach arms, means rigidly mounting the reach arms at one end of the table, said arms inclining toward said table, and rigid slat holddown finger means on the ends of said bars, said finger means including wedge-shaped heads situated in advance of the groove, and a powered endless band saw having its effective run disposed in elevated parallelism above said conveyor belt and in alignment with said groove, the finger means having clearance notches for the coacting run of said band saw.

4. A crate disassembling and parts salvaging machine of the class described comprising a horizontal fixed table having pocket means adapted to accommodate a deflected bend in a flexible belt and to permit a slat to be angularly depressed therein, a conveyor belt having a crate conveying run movable across the top of said table and spanning said means, a powered saw having a nail severing run extending at right angles to the longitudinal direction of movement of said belt and located in a position spaced above the belt and in alignment with said means, a plurality of fixed slat holddown fingers, means fixedly mounting said fingers on said support, said fingers being located directly above said means and having wedge-shaped heads inclining toward said means and adapted to deflect the stated slats against said belt for bending the belt and flexing same into said means.

5. The structure specified in claim 4 together with an upstanding fixed guide along one longitudinal marginal edge of said belt and in predetermined relationship to said means, said guide serving to facilitate maneuvering a crate toward said means, said saw and said fingers.

6. A crate disassembling and parts salvaging machine of the class described comprising a horizontal fixed table having a transverse groove intermediate its ends, a powered endless flexible crate moving belt having its crate supporting run movable across the top of said table and spanning said groove, the portions spanning the groove being adapted to be depressed into the groove, a pair of reach arms rigidly mounted in elevated positions at one end of said table and overlying said belt, said reach arms having end portions terminating adjacent to said groove, said end portions being provided with rigid fingers, said fingers extending transversely across the groove and overlying the belt and terminating in wedge-shaped heads situated in advance of the groove, said heads having guide notches, an endless band saw having one run disposed in elevated parallelism above said conveyor belt and in alignment with said groove and operating in said notches, and an upstanding crate guide fixed on said table along one longitudinal edge of said belt to assist the attendant in piloting the crate, through the aid of the belt and guide into slat removing relationship relative to said heads.

7. A machine of the class shown and described comprising a frame, supports for said frame, a table supported on said frame, idling drums mounted at opposite transverse ends of said table, an endless conveyor belt trained over said drums, a motor on said frame, an operating connection between the motor and one of said drums, a pair of pulleys mounted on said frame on opposite sides of the table, a second motor on said frame, an operating connection between said second motor and one of said pulleys, and a band saw trained over said pulleys and having its working run operable in a plane spaced above said belt, that portion of the table beneath the run of the band saw having a transverse groove and said conveyor belt operating across said groove, a pair of downwardly inclined, rigidly mounted reach arms, and holddown and slat loosening and deflecting means on the downwardly inclined ends of said arms overlying the stated run of said band saw.

ERNEST E. CANNON.

REFERENCES CITED

The following references are of record in the file of this patent:

UNITED STATES PATENTS

| Number | Name | Date |
|---|---|---|
| 381,977 | Avery | May 1, 1888 |
| 960,952 | Keighley | June 7, 1910 |
| 1,112,822 | Mershon | Oct. 6, 1914 |